UNITED STATES PATENT OFFICE.

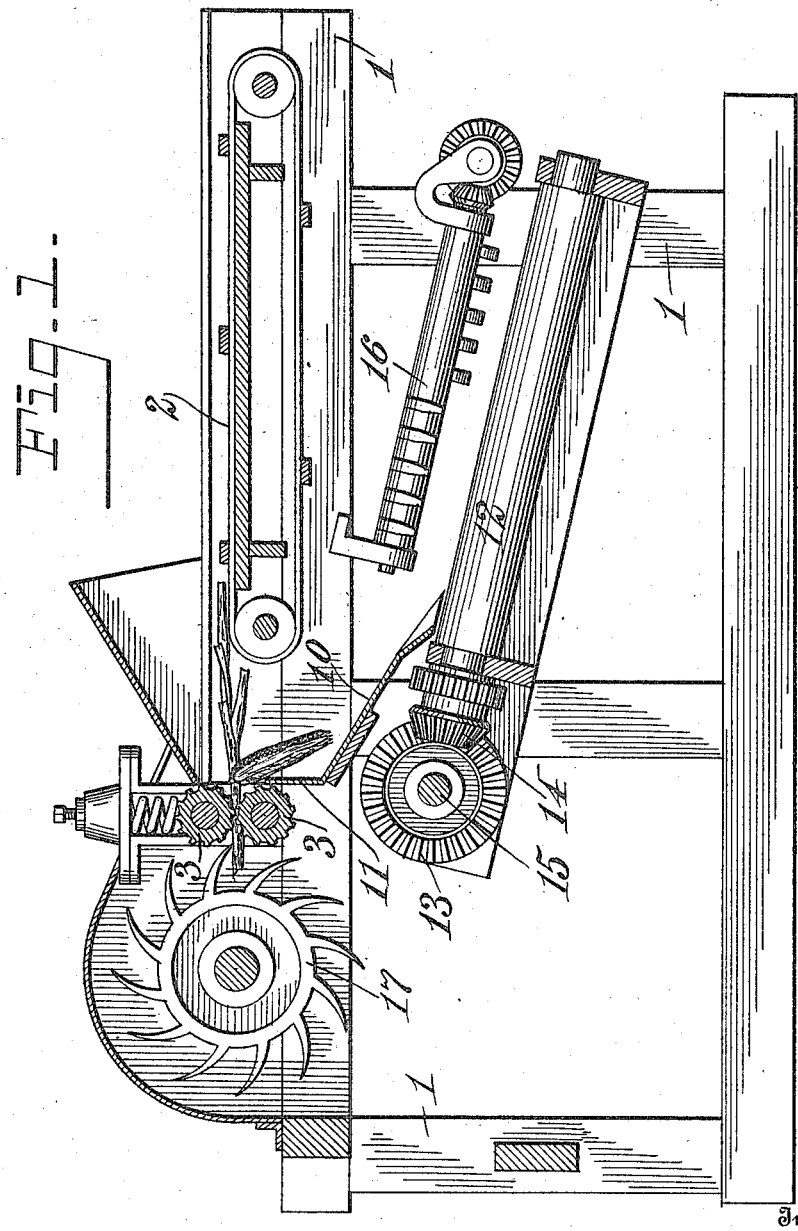

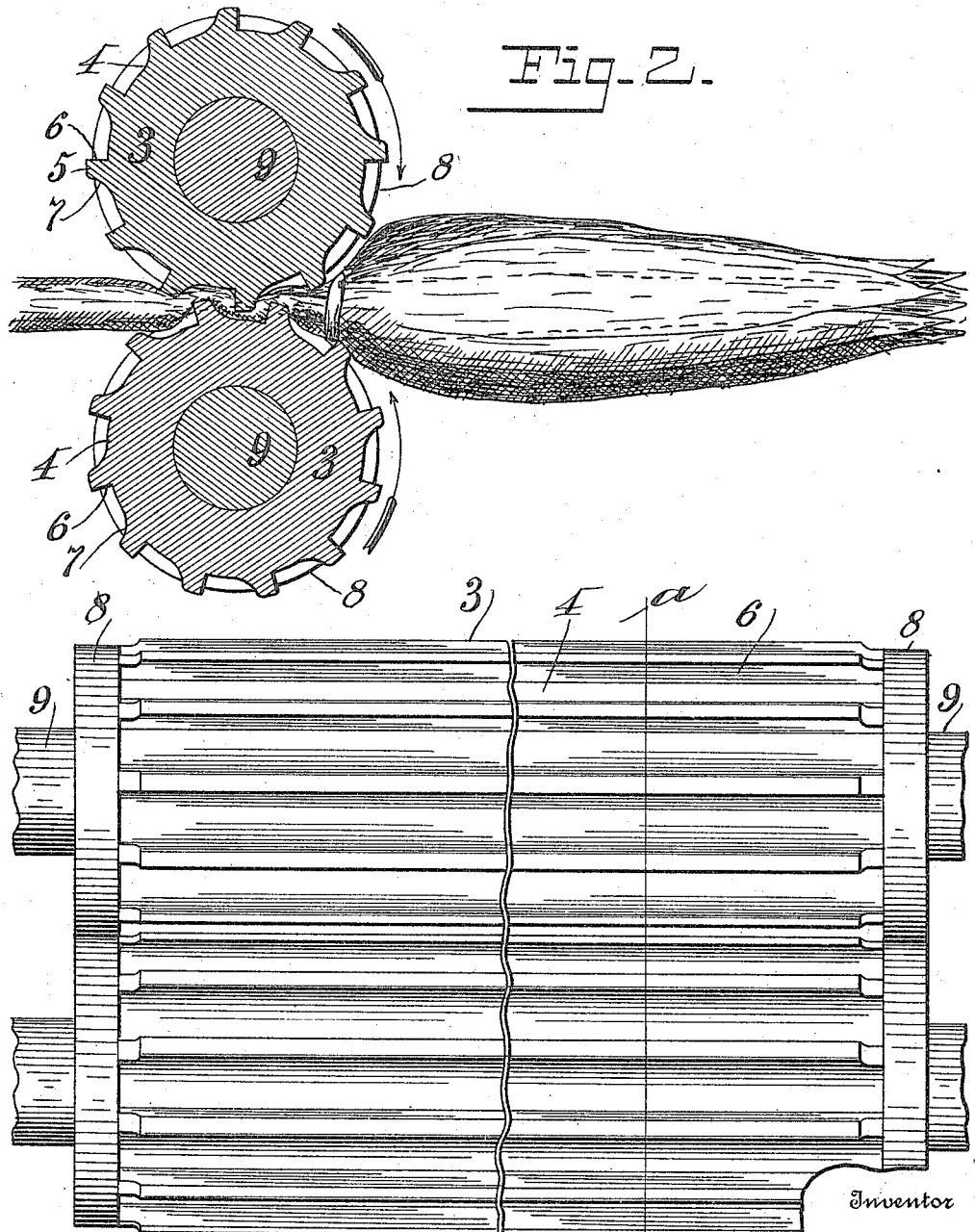

EDWIN O. KREITZER, OF NEW LEBANON, OHIO.

CORN-HUSKING MACHINE.

1,188,084.  Specification of Letters Patent.  Patented June 20, 1916.

Application filed December 27, 1915. Serial No. 68,620.

*To all whom it may concern:*

Be it known that I, EDWIN O. KREITZER, a citizen of the United States, residing at New Lebanon, in the county of Montgomery and State of Ohio, have invented certain new and useful Improvements in Corn-Husking Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in corn husking machines.

The object of the invention is to provide a machine of the above character which is capable of handling a greater amount of fodder within a given period of time and which does not require the operator or attendant to force or crowd the fodder to the snapping rolls in order to insure a gripping of the fodder by the rolls. In a word, the object and purpose of my invention is to provide an improved form of snapping rolls which readily take hold of the fodder in feeding the same through the rolls and snap the ears of corn off at the stem without the liability of drawing the said ears into the rolls. Little or no manipulation is required in feeding the stalks to the snapping rolls and little or no shelling of corn from the ears results from the operation.

The formation of the snapping rolls and the chute for the ears of corn will be particularly described in the description to follow as these elements constitute the features through the instrumentality of which much of the trouble attending machines of this character is avoided.

Referring to the accompanying drawings which illustrate my improvements, Figure 1 is a sectional elevation of a corn husking machine having my improvements applied thereto; Fig. 2 is an enlarged cross-sectional view of the snapping rolls on the line *a—a* of Fig. 3 with a stalk of fodder passing therethrough and an ear of corn in the position where the stem is snapped; and Fig. 3 is a horizontal plan view of the snapping rolls with parts broken away to facilitate illustration.

In a detail description of the invention, similar reference characters indicate corresponding parts.

Referring more particularly to the drawings, 1 designates a suitable machine frame having a horizontal fodder conveyer 2 mounted in the upper portion thereof in the usual manner. In line with this fodder are mounted two snapping rolls 3—3 to which special attention is directed; see Fig. 2. These snapping rolls are provided with longitudinal peripheral grooves 4 of comparatively shallow depth and each of which is inclosed by teeth 5. One surface of these teeth is straight as at 6 and the other surface 7 is chamfered. These teeth so provided with straight and chamfered surfaces lie a substantial distance apart to provide a proper width for the grooves 4. The said rolls at each end are provided with smooth annular end surfaces 8 which contact with each other and form bearing surfaces at the ends of the rolls in addition to the usual bearings for the journals 9 of said rolls. The teeth 5 of said rolls project beyond the circumference of the smooth annular surfaces 8 and the said rolls are constructed and mounted so that said teeth project into the adjacent grooves approximately half the depth of said grooves, as shown in Fig. 2. In this figure of the drawings, a stalk of fodder is shown in the act of passing through the rolls. The stalk, it will be observed, is caught by the outer edge of the straight sides of the teeth and is carried through the rolls. The straight surfaces of the teeth provide sharp corners which grip the stalks, etc., which are crowded into the grooves and the chamfered sides of said teeth snap the ears from the stalks. The ears of corn are snapped from the stems at the entrance to said rolls, the outer edges of the straight sides of the teeth, for example, a tooth of the upper roll, as shown in Fig. 2, engaging the stalk adjacent to the forward portion of the stem, and a similar part of the other tooth, for example, a tooth of the lower roll, engaging the stalk forward of the first named tooth to force it through the rolls, and at this point the ear of corn is snapped from its stem by the chamfered side 7 and drops from the rolls before the ear is caught by said rolls and crushed. It will be understood that the positions of the ears are irregular, on more or less angles to the stalk. The fodder is conveyed to the snapping rolls by the conveyer 2, and by reason of the peculiar construction of the teeth of the snapping rolls, to-wit, the shallowness of the grooves intervening between the teeth and the peculiar shape of the teeth themselves, is readily caught with no urging or crowding of the fodder on the part of the operator and, as said fodder is fed through the rolls, the ears are crowded against the chamfered sides of the teeth and are snapped from their stems in the manner above described and fall entirely free from the rolls onto an incline chute 10. The upper portion 11 of this chute stands upright in front of the lower snapping roll, as shown in Fig. 1. The ears of corn when snapped from the stalks drop on the outer side of this upright portion of the chute and thence onto the incline portion 10 from which they discharge to the husking rolls 12 which are of the usual form and are driven in the usual manner from bevel gears 13 and 14, the former being mounted on a driven shaft 15. The usual agitator member 16 is mounted above the husking rolls to agitate the ears of corn thereon. As the fodder is passed through the snapping rolls it is engaged by a threading cylinder 17 of usual construction but forming no part of the present invention, the present invention, as before stated, being confined to the snapping rolls and the means for delivering the ears of corn free from said rolls and thus preventing any clogging up or impediment at the entrance to said snapping rolls. The chute 10, together with its upright portion 11, is mounted transversely and the incline portion thereof lies a considerable distance below the snapping rolls.

Having described my invention, I claim:

In a machine of the type specified, the combination of a pair of snapping rolls provided with teeth and intervening shallow grooves, the teeth being straight on one side and chamfered on the other side, the straight sides of said teeth being adapted to grip the stalks of corn to force them through the rolls and the chamfered sides of said teeth being adapted to snap the ears of corn from the stalks at the entrance between said rolls, substantially as specified.

In testimony whereof I affix my signature, in presence of two witnesses.

EDWIN O. KREITZER.

Witnesses:
MELLIE GALLOWAY,
MATTHEW SIEBLER.

Copies of this patent may be obtained for five cents each, by addressing the "Commissioner of Patents, Washington, D. C."